June 14, 1932.  B. H. WILE  1,863,144
SHOCK ABSORBER
Filed May 9, 1930
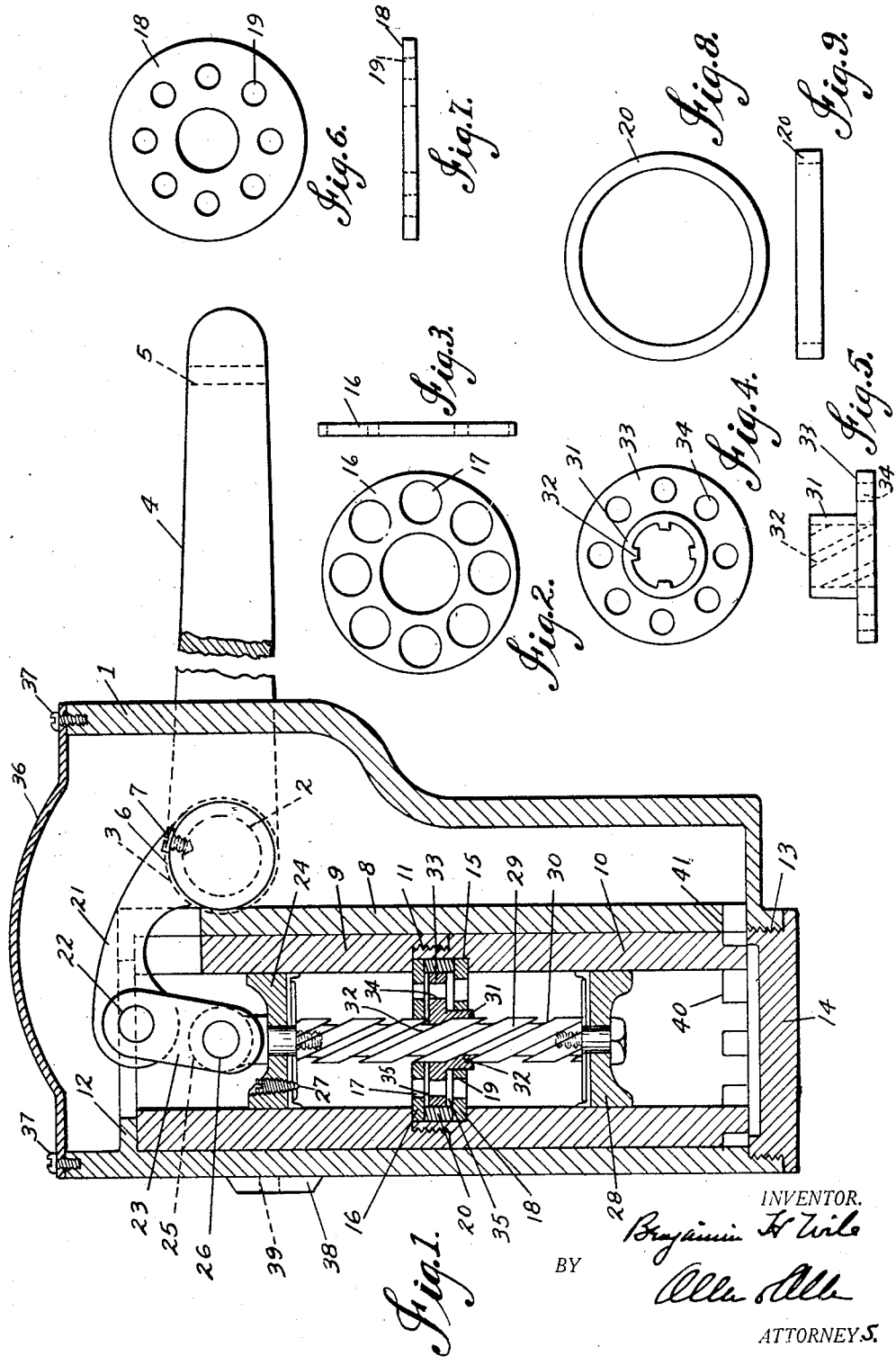

Patented June 14, 1932

1,863,144

UNITED STATES PATENT OFFICE

BENJAMIN H. WILE, OF LOUISVILLE, KENTUCKY

SHOCK ABSORBER

Application filed May 9, 1930. Serial No. 450,979.

My invention relates to shock absorbers, and particularly to a novel type of shock absorber in which the initial shock and the recoil stroke are proportionately controlled so that while the passage of hydraulic fluid is substantially free with the initial movement of the parts, the greater the movement the more the flow of fluid is restricted, so that in its control the shock absorber provides a perfectly balanced cushioned effect.

While others have provided shock absorbers of the piston type in which there is some effort to proportionately control the direct and recoil stroke, it is my object to provide a construction in which the cutting off of the flow of compressed fluid increases proportionately and decreases proportionately in an exact ratio.

It is further my object to provide a rotary disc valve control which will be actuated by a spirally threaded member which moves up and down with the operation of the shock absorber, thereby increasing the smoothness of operation of the device, and at the same time providing one in which there is substantially no possibility that a violent impetus will throw the device out of adjustment.

The above object and other objects to which reference will be made in the ensuing disclosure, I accomplish by that certain combination and arrangement of parts of which I have shown a preferred embodiment.

Referring to the drawing:

Figure 1 is a sectional view showing the complete shock absorber and housing therefor.

Figure 2 is a plan view of one of the discs having enlarged interspaced ports.

Figure 3 is a side elevation of the disc shown in Figure 2.

Figure 4 is a plan view of the disc valve.

Figure 5 is a side elevation of the control valve shown in Figure 4.

Figure 6 is a plan view of the other of the concentrically ported discs.

Figure 7 is a side elevation of the disc shown in Figure 6.

Figure 8 is a plan view of the spacing washer.

Figure 9 is a side elevation of the spacing washer.

Extending across the shock absorber housing 1, I have shown the spindle 2 with packing nuts 3 which provide a sealed joint between the portion of the spindle 2 within the housing and the portion which extends out through the sides and to which the shock absorbing arm 4 is connected. The shock absorbing arm 4 is provided with an aperture 5 by which a suitable tie rod or bolt may be employed to secure the arm to the chassis frame of the vehicle. The shock absorbing arm has an enlarged boss 6 having an annular orifice which fits over the end of the spindle 2 extending out through the housing, and the arm 4 may be attached to the spindle by means of a threaded stud 7. Within the housing 1 there is a baffle wall 8 which extends around in a circular manner so as to receive the hydraulic cylinder composed of the upper cylinder 9 and lower cylinder 10, which are threadably connected as indicated at 11.

The composite cylinder is inserted within the cylindrical opening in the housing 1, and it is held rigidly therein by means of an annular shoulder 12 against which the upper end of the composite cylinder bears. The housing has a threaded orifice 13 in its base within which is screwed the plug 14 which bears against the lower end of the composite cylinder.

The cylinder member 10 has an internal annular recess 15 within which the proportional controlling device is located. I have shown the disc 16 having concentric spaced ports 17 and the disc 18 having concentric spaced ports 19. A spacing washer 20 extends between the discs 16 and 18, and allows some clearance between the parted discs and the disc and the disc valve.

Secured on the spindle 2 is a rocker arm 21. A pivot pin 22 secures a link 23 to the upper piston 24. The piston 24 has a boss 25 with a journal pin 26 which engages the end of the link 23 opposite the connection with the rocker arm 21.

The piston 24 has a screw 27 extending through its wall which may be removed for filling the hydraulic cylinder between the two pistons. The lower piston is indicated at 28 and extending between the pistons there is a rod 29 having spiral threads 30 therein.

The disc valve which controls the proportional cutting off of the compression strokes has a hub portion 31 having spaced projections 32 which seat within the spiral threads of the rod 29. The disc valve has a flanged portion 33 having concentrically spaced ports 34 therein. It will be noted that the spacing washer is thicker than the thickness of the flange 33 of the disc valve, so that it is free to admit the passage of fluid through the spaces 35 when it begins to move from its middle position.

The shock absorber housing is provided with a cover member 36 secured to the end of the housing with studs 37.

In installing the shock absorber on a vehicle the housing may have integrally cast projecting wings 38 having bolt holes 39 extending through, through which the housing may be secured in a desirable manner to the body of the car. The arm 4, as has been stated, is secured to the chassis frame. The cover 36 is removed and with the screw 27 removed and with the ports 40 in the member 10 and the port 41 in the wall 8, lubricant will entirely fill the housing, including the space between the pistons 24 and 28. After the cylinder enclosed between the pistons is filled the screw 27 is replaced. The cover 36 is then secured in position and the shock absorber is ready to function. If the vehicle goes over a bump the chassis frame tends to rise with reference to the body. The arm 4 would then turn in a counter-clockwise direction as indicated in Figure 1, causing the pistons 24 and 28 to move downwardly within the cylinder. As the piston 24 approaches the disc 16 the movement of the spirally threaded rod 29 causes the disc valve 33 to rotate relative to the fixed disc 16, closing the opening gradually as the piston 24 descends. Before the piston 24 reaches the disc 16 the oil within the space between the piston and the disc is completely trapped, as the oil is not compressible, the movement of the piston 24 downwardly is entirely blocked. Thus in this stroke of the shock absorber the piston 24 starts to move with a substantially free passage for the fluid trapped between the piston and the disc 16, but flow through the ports 17, 34 and 19 results proportionately until further movement is blocked as the piston 24 descends.

On the recoil stroke when the arm 4 as indicated in Figure 1 is moving in a clockwise direction, oil flows at first slowly through the spaces 35 and when the middle position is reached, when the ports in the disc and the ports in the valve are in register, it flows more rapidly. From this position on the compression of the fluid between the piston 28 and the disc 18 proceeds in the same proportionate manner as on the initial stroke which has been described.

Since the entire housing is filled with oil, and since the plug 14, cover 36, and packing gland 3 are substantially oil tight, there will be no difficulty because of leakage of fluid from within the compression cylinder.

Having thus described my invention, what I claim as new and desire to secure by Letters Patent, is:

1. A hydraulic shock absorber comprising in combination a cylinder for hydraulic fluid, a spiral threaded piston rod, pistons secured at the ends of the rod reciprocal within the cylinder with the direct and recoil strokes of the shock absorber, a pair of spaced discs having radially spaced ports therein fixedly mounted within said cylinder intermediate said pistons, and a disc valve having radially spaced ports mounted intermediate said spaced discs, said valve rotatable with the movement of the piston rod to open and close the ports in said discs.

2. A hydraulic shock absorber comprising in combination a cylinder for hydraulic fluid, a spirally threaded piston rod, pistons secured at the ends of the rod reciprocal within the cylinder with the direct and recoil strokes of the shock absorber, a pair of spaced discs having radially spaced ports therein fixedly mounted within said cylinder intermediate said pistons, and a disc valve having radially spaced ports mounted intermediate said spaced discs, said valve rotatable with the movement of the piston rod to open and close the ports in said discs, and said disc valve having a limited range of movement between said discs.

3. In a hydraulic shock absorber, a hydraulic cylinder, a pair of spaced discs intermediate the ends of said cylinder having ports therein, and a piston rod carrying pistons reciprocable within said cylinder to approach and move away from said spaced discs, a disc valve having ports therein mounted intermediate said discs and means interconnecting said piston rod and valve for rotating said disc valve to proportionately reduce the flow of liquid through said ports during the movement of said pistons.

4. In a hydraulic shock absorber, a hydraulic cylinder, a pair of spaced discs intermediate the ends of said cylinder having ports therein, a piston rod carrying pistons reciprocable within said cylinder to approach and move away from said spaced discs, a disc valve having ports therein mounted intermediate said discs and means interconnecting said piston rod and valve for rotating said disc valve to proportionately reduce the flow of liquid through said ports during the movement of said pistons, said cylinder being composed of two parts having a threaded engagement with recesses formed in one of the parts for receiving said spaced discs, with a spacing washer mounted between said discs.

5. A hydraulic shock absorber comprising a cylinder, a piston rod, spaced pistons on said rod reciprocable in said cylinder, a plurality of apertured valve elements concentric with said rod, one fixed to the cylinder and the other rotatable relatively to the one, and means whereby reciprocation of said rod rotates said other valve element.

6. A hydraulic shock absorber comprising a cylinder, a piston rod, having threads, spaced pistons on said rod reciprocable in said cylinder, a plurality of apertured valve elements concentric with said rod, one fixed to the cylinder and the other rotatable relatively to the one, and the other engaging said threads to be rotated upon reciprocation of said rod.

7. A hydraulic shock absorber comprising a cylinder, a piston rod, spaced pistons on said rod reciprocable in said cylinder, a plurality of apertured valve elements concentric with said rod, two fixed to the cylinder and the other between and rotatable relatively to the other two, and means whereby reciprocation of said rod rotates said other valve element.

8. A hydraulic shock absorber comprising a cylinder, a piston rod having threads, spaced pistons on said rod reciprocable in said cylinder, a plurality of apertured valve elements concentric with said rod, two fixed to the cylinder and the other between and rotatable relatively to the other two, and the other engaging said threads to be rotated upon reciprocation of said rod.

BENJAMIN H. WILE.